Jan. 19, 1943.  L. W. DAILEY  2,308,677
JOINT DEVICE FOR PAVING CONSTRUCTION
Filed Oct. 10, 1939  4 Sheets-Sheet 1
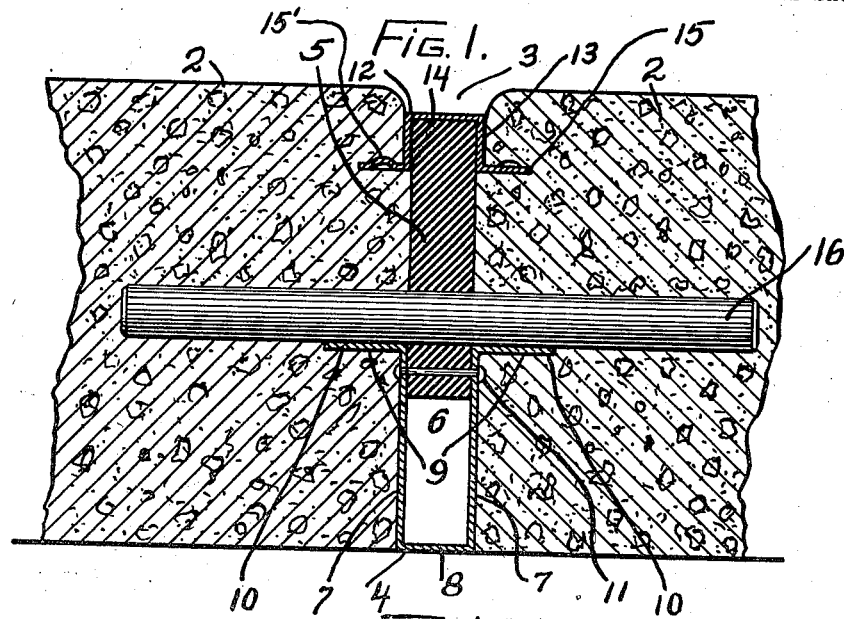
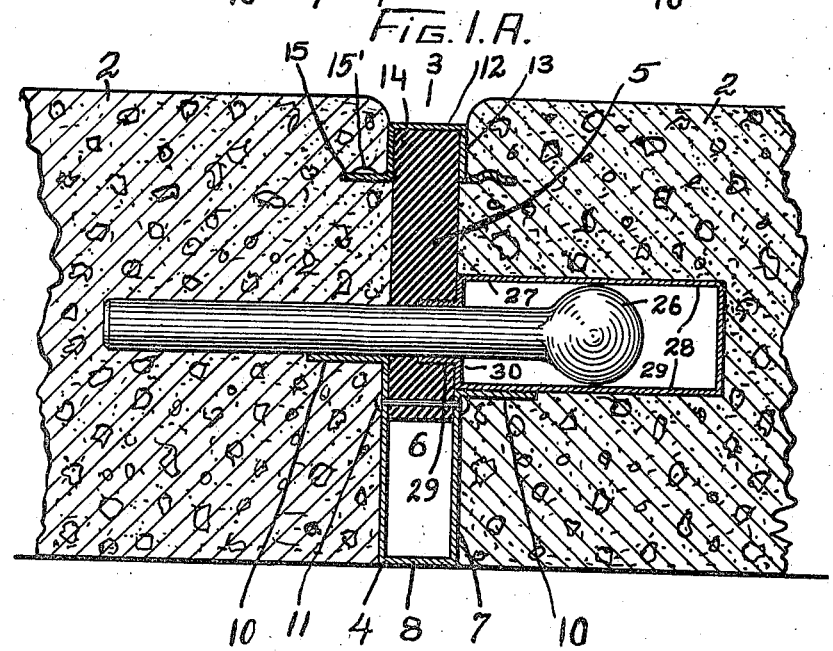
Lester W. Dailey.
INVENTOR.
ATTORNEY.

Jan. 19, 1943.　　　　L. W. DAILEY　　　　2,308,677
JOINT DEVICE FOR PAVING CONSTRUCTION
Filed Oct. 10, 1939　　　4 Sheets-Sheet 2
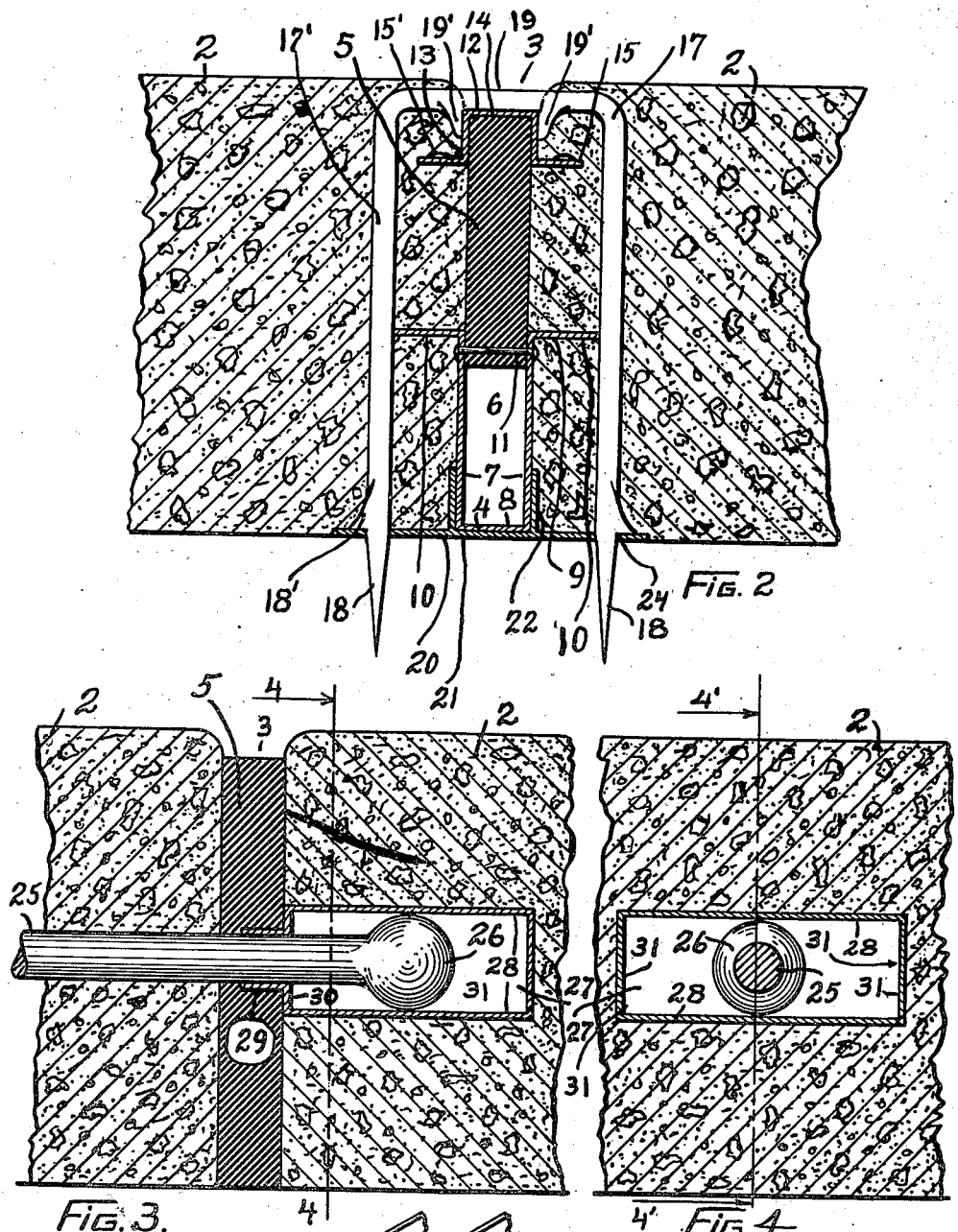
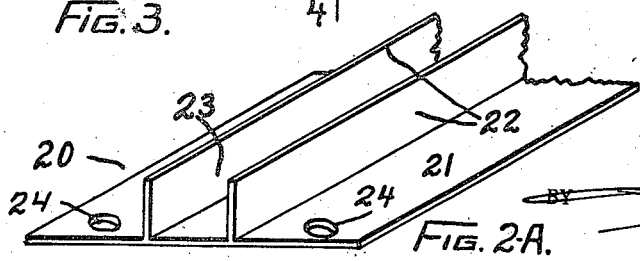
Lester W. Dailey
INVENTOR.
ATTORNEY.

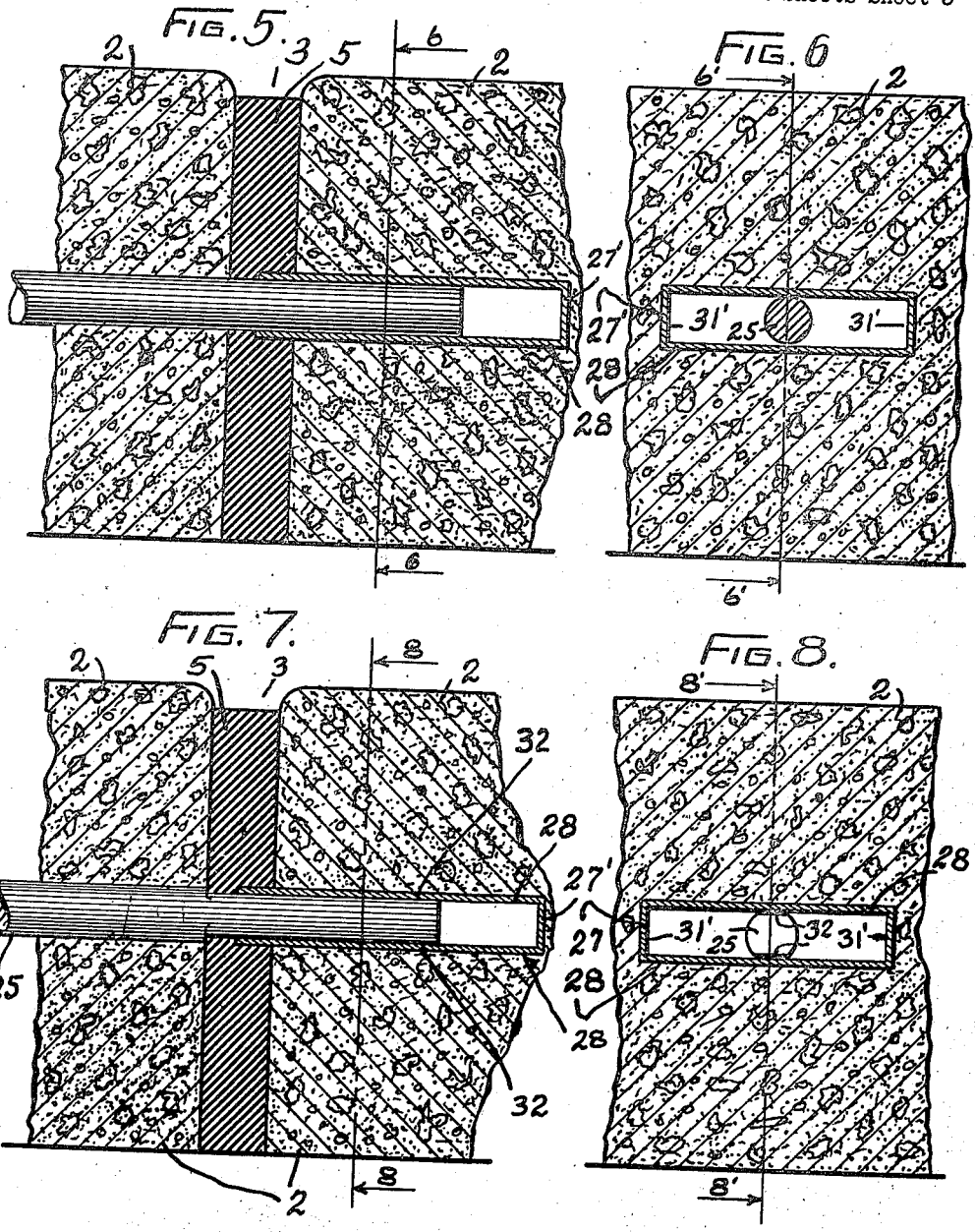

Jan. 19, 1943. L. W. DAILEY 2,308,677
JOINT DEVICE FOR PAVING CONSTRUCTION
Filed Oct. 10, 1939 4 Sheets-Sheet 4
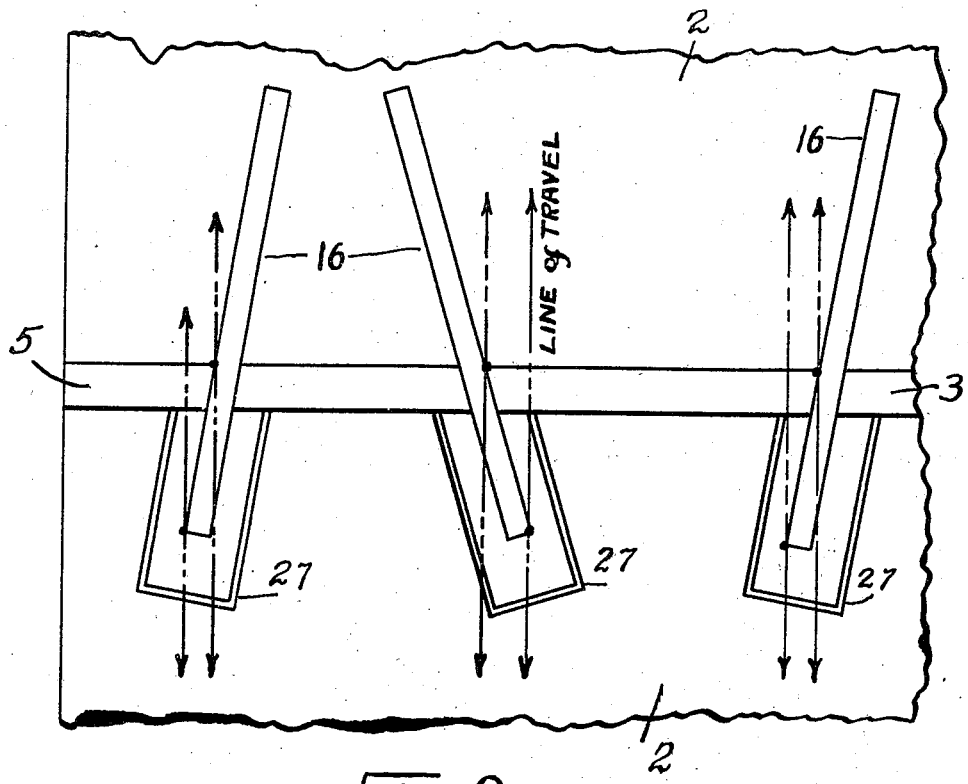
Fig. 9.
Fig. 10.
Lester W. Dailey
INVENTOR.
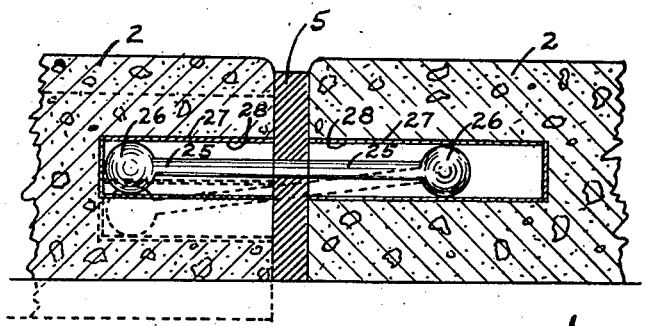
ATTORNEY.

Patented Jan. 19, 1943

2,308,677

UNITED STATES PATENT OFFICE 2,308,677

JOINT DEVICE FOR PAVING CONSTRUCTION

Lester W. Dailey, Fort Wayne, Ind., assignor to Herbert C. Jussen, Mariemont, Ohio Application October 10, 1939, Serial No. 298,823

10 Claims. (Cl. 94—18)

This invention relates to a joint construction in concrete paving and particularly pertains to a joint construction having an expansion joint unit, including a filling strip interposed in the space between the adjacent ends of spaced apart paving sections and/or dowel means associated with the adjacent ends of the paving sections for transmitting the load from one paving section to another.

The expansion joint unit may be used alone or in conjunction with the dowels in the paving. So, too, the dowels may be used alone or with the expansion joint unit. While the expansion joint unit and the dowels may be separately used, they do, if used together, function cooperatively to provide a load transmitting expansion joint unit.

For a better understanding of the invention reference may be made to the accompanying drawings, in which:

Fig. 1 is a cross-sectional view of a paving section embodying the expansion joint unit of the invention and conventional dowels;

Fig. 1A is a cross-sectional view of a paving section embodying the expansion joint unit and the dowels of the invention;

Fig. 2 is a cross-sectional view of a paving section showing one manner of staking the expansion joint unit in place with base plate;

Fig. 2A is a perspective view of the base plate;

Fig. 3 is a cross-sectional view on line 4'—4' of Fig. 4 of a paving section showing a modified form of the dowel pin construction;

Fig. 4 is an end view taken on lines 4—4 of Fig. 3;

Fig. 5 is a cross-sectional view on line 6'—6' of Fig. 6 of another embodiment of dowel pin construction;

Fig. 6 is an end view taken on lines 6—6 of Fig. 5;

Fig. 7 is a cross-sectional view on line 8'—8' of Fig. 8 of still another embodiment of dowel pin construction;

Fig. 8 is an end view taken on line 8—8 of Fig. 7;

Fig. 9 is a diagrammatic plan view of a paving section showing a plurality of the dowel pins and a more detailed view of their association with the ends of the paving sections; and Fig. 10 is a cross-sectional view of another embodiment.

Referring particularly to the drawings in which like numerals are used to designate like parts, numeral 2 represents sections of paving formed from concrete poured in place between joint units 3 disposed transversely at spaced intervals. The joint units comprise generally a base member 4 and a strip 5. Joint strip 5 may be of any yieldable material, preferably asphaltic compound having finely divided filling material incorporated therein, with or without saturated felt layers applied to the face of the strip or embedded therein to reenforce same. The strip is advantageously supported in the base member 4 which is of some relatively thin metal, such as sheet metal or the like, bent to provide a chamber or space 6 between side walls 7 and an end 8. The terminals 9 of the side walls may be bent in opposite directions to provide substantially horizontal flanges 10 and leaving the chamber or space 6 open opposite to the closed end 8. The width at the top of the space 6 between the walls 7 is approximately equal to the width of the joint strip 5 so that the lower end of the joint strip may be inserted between the walls and be in close contact with the walls of the base member. Below the top of the walls of the base member, the walls 7 may be narrowly or widely spaced to provide for the desired volume of space 6 to receive the joint material therein when it is displaced downward from its normal location when installed. Only a small part of the joint strip is projected into the space of the base member, so that the bottom edge of the strip will be spaced from the closed end 8 of the base member and leave a substantial part of the space initially unfilled. This permits movement or displacement of the joint strip into the space 6 upon expansion of the pavement without causing extrusion of the strip upward and above the surface of the concrete sections.

In order that the joint strip may be held positively in spaced relationship from the bottom of the base member, one or more pins 11 may be projected at spaced intervals through the side walls of the base member and below the bottom edge of, or through, the joint strip which is inserted between said walls. The pins hold the joint strip spaced apart from the closed end 8 of the base member during the installation of the joint unit but will not prevent the joint material from being gradually squeezed into the chamber or space 6 when the joint material is subjected to compression because of the expansion of the paving sections.

To prevent any extrusion of the joint strip upwardly and out of the joint space between the paving sections, a cap seal 12 is provided. This cap seal thus forces any displacement of the expansion joint filler material in a downward direction. The cap seal is of the same general contour as the base member having parallel walls 13 extending from end 14 and terminating in oppositely disposed flanges 15. These flanges 15 may be deformed to provide an embossment or indenture 15' for positively engaging or interlocking with the concrete sections. The open end of the cap seal 12 receives the top edge of the joint strip 5. The cap seal may be formed of any thin material, such as sheet metal or the like, the same as the base member 4.

The joint strip is provided along its length with any number of perforations through which dowel pins 16 are projected to extend across the joint space and be fitted in the ends of adjacent paving sections for transmitting the load from one paving section to another. The dowel pins are optional and can be used with or without the joint unit. If dowels are used, the perforations in the joint strip are disposed so that the dowels preferably rest upon the oppositely disposed flanges 10 of the base member 4.

Any suitable means may be employed for holding the joint unit in position upon the subgrade surface previous to the paving sections being poured between the spaced apart joint strips. Stakes 17 are particularly suitable. They are substantially U-shaped with legs 17', each provided with a pointed end 18 adapted to be driven into the subgrade surface. The head portion 19 is provided with spaced apart lugs 19' which fit over the cap seal 12, the lugs 19' bearing against the sides of said cap seal. Lugs 18' are provided on each of the legs 17' near the bottom end of the stake for a purpose hereinafter described. The joint unit is preferably seated on base plates 20, deposed at intervals, the base plate being provided with a bottom 21 having spaced apart upwardly projecting members or flanges 22 providing a space 23 therebetween into which the bottom edge of the base member 4 is adapted to be seated. Perforations 24 are formed in the base plate 20 to receive stakes 17, the perforations being preferably formed so that they are in a vertical line with the ends of the flanges 10 so that when the stakes are driven into place they will impinge against the ends of the flange 10 of the base member 4, thereby cooperating with the flanges 22 on the base plate for holding the base member 4 more firmly in place. The lugs 18' provide an enlarged portion to abut the upper side of the base of the base plate 20, thereby affording a means to hold the base plate firmly against the subgrade. The expansion joint strip 5 extends throughout the width of the pavement and the base member 4 is preferably coextensive with it in length in order that there may be uniform displacement of the strip into the space throughout the length of the expansion strip. This provides a single continuous space. It, of course, is within the scope of the invention to provide in the base two or more smaller spaces separated apart rather than one continuous space. Or the bottom wall of the base can be corrugated with the elevations of the corrugations contacting with the bottom edge of the strip 5 and the valleys between the elevations providing spaces into which said joint can be squeezed under compression.

The ends of the spaces 6 are preferably closed to prevent flow of foreign material therein. A suitable closure plug or end closure may be fitted in or against the ends of the base for this purpose.

The joint unit construction as stated above, may be used with or without dowels. If dowels are employed, they may be of conventional form shown in Fig. 1 or of the novel construction shown in Figs. 3 to 8, inclusive and in Fig. 10. The dowels may be of any cross-sectional configuration, such as being rectangular, or the like, but are usually cylindrical. In the present invention one end of the dowels 25 may be enlarged to provide an enlarged head 26 of rounded or curved contour. The rounded head cooperates with a cap member 27 preferably having an interior rectangular space fitting over the rounded head. This cap is adapted to be embedded or anchored in the end of one of the adjacent paving sections. The vertical depth of the rectangular member between the inner walls 28 is slightly greater than the cross-section of the rounded head of the dowel pin, whereas the horizontal width between the side walls 31 is of any width desired but substantially exceeding the cross-section of the rounded head. This construction provides a universal pivot between the dowel pin and the rectangular cap member 27 or the paving section in which the rectangular cap member is inserted.

The movement of the paving sections resulting from contraction and expansion is longitudinal and parallel to the direction of the center line of the pavement, and is in a plane parallel to the surface of the concrete sections and to the surface of the subgrade. Heretofore in order for dowels to function properly, they had to be installed in a plane parallel to the surface of the concrete sections and to the surface of the subgrade, and also in a plane parallel to a vertical plane through the center line of the pavement. Otherwise the adjacent concrete sections would not have free movement but would be locked against movement during contraction and expansion of the paving sections. As a practical matter, dowels usually are not properly installed because of poor and hasty workmanship and because of the difficulty in having them in proper alignment even though extreme care be taken for that purpose.

Therefore, it is one of the aims of this invention to have a dowel construction that will permit free movement of the adjacent concrete sections even though the dowels may not be installed in proper alignment. In fact the novel and improved construction of the dowels is such that their installation in proper alignment is unnecessary.

In the dowel construction shown in Figs. 3 and 4 with the rounded end 26, the displacement of the dowel pins 25 may be in a plane not parallel to the surface of the concrete sections and not parallel to the surface of the subgrade. This will not, however, prevent free movement of the concrete sections because the rounded head of the dowel permits it to move longitudinally relatively to the cap member 27 in the space therein provided. This invention permits displacement of the dowel during installation from a plane parallel to the surface of the concrete sections and to the surface of the subgrade which displacement is limited by the distance between the surfaces of the dowel shank (that portion of the dowel exclusive of the rounded head) at the portion adjacent to the open end of the cap member and the walls 28 of the cap member 27 at its open end or the end near or flush with the end of the concrete slab in which the cap member is embedded.

The open end of the cap member 27 may be constricted by the ends 29 bent inwardly and parallel to the shank of the dowel with a stepped portion 30 between the ends 29 and walls 28. The material of the cap member being light metal, the ends 29 and steps 30 are easily fixed by the displacement of the dowel pins and do not prevent the free movement of the dowels or that of the concrete sections relative to the dowels. The ends 29 and the steps 30 above or below the dowels will be pushed upwardly or downwardly, depending upon whether the ends of the dowels in the cap members are being displaced upwardly or downwardly, and offer no substantial resistance because of the lightness of the material. Thus there is free movement of the dowels relatively to the cap members until the shanks of the dowels engage one of the walls of the cap member, the walls of the cap members being encased and surrounded by the concrete will, of course, limit the free movement of the dowels.

Displacement of the dowels during installation from a plane parallel to a vertical plane through the center line of the pavement is permitted by reason of the width between the walls 31 of the cap member being in excess of the cross section of the head of the dowel. The excessive space between the head of the dowel and the walls of the cap member gives room for movement of the free end of the dowel in and relative to the cap member. This provides free movement of the free ends of the dowels as more particularly shown in Fig. 9, it being pointed out above that the ends 29 and steps 30 do not interfere. It is, of course, understood that the opposite ends of the dowels are anchored in the end of the adjacent concrete section as is customary in the ordinary dowel installation. The arrows indicate the direction of the lines of travel of the loose ends of the dowels relative to that end of the paving section in which the caps 27 are embedded.

In Figs. 5 and 6 where the cross section of the dowel is of the same cross section throughout its length, displacement of the dowel pin from a plane parallel to a vertical plane through the center line is also permitted by reason of the width between the walls 31' of the cap member 27' being in excess of the cross section of the dowel 25. The free movement between the free end of the dowel and the paving section is much the same as that described above, the only difference being there is no head portion larger than the shank portion.

The construction in Figs. 7 and 8 differs from that of Figs. 5 and 6 in that the dowel is provided with opposite top and bottom flattened surfaces 32 to form a greater area of contact with the opposite walls 28 than if the dowels were cylindrical as in Figs. 5 and 6, thus providing a greater bearing surface between the dowels and the concrete sections.

The embodiment in Fig. 10 is illustrative of a dowel paving joint construction whereby the ends of adjacent pavement sections 2 are connected for readily permitting limited relative vertical movement. Dowels are heretofore commonly used resist vertical displacement of the ends of adjacent pavement sections, but while resisting vertical displacement the force which they resist is often sufficient to bend them where they span the joint space between spaced apart pavement sections. When bent the dowels are as resistant in preventing the adjacent pavement sections returning to their original normal position as they were resistant in first holding the pavement sections in their original normal position. Subsequent displacements and returns to normal position of the adjacent pavement sections by mud jacking or the like result in bending and rebending of the dowels and may eventually cause the dowels to shear at the joint space and thus render them useless. Furthermore, the force set up by the vertical displacement of one pavement section relative to the adjacent pavement section causes a lever action along the dowel upon the end projecting into the latter mentioned adjacent pavement section. This lever action may create a force sufficient to cause cracking or breaking off of the end of said latter mentioned adjacent pavement section. The aim of this phase of the invention is to provide for a limited vertical movement of one pavement section relative to the adjacent pavement section without causing the dowel to be bent. This displacement is limited by the distance between the surfaces of the dowel shank at that portion adjacent to the open end of the cap member 27 and the walls 28 of said cap member (Fig. 10) at its open end or flush with the end of the pavement section in which the cap member 27 is embedded. To obtain this result the dowel 25 in Fig. 10 is provided at each end with an enlarged rounded head 26, each rounded head being received in a substantially open end cap member 27 embedded in each of the pavement sections with the open end facing the joint space. If desired the open end of the cap member 27 may be provided with a constricted neck as in the other embodiments. Conversely, the cap member 27 in the other embodiments may have an open end and without the constricted neck. The full lines show the pavement sections and dowel in their normal position and the dotted lines show one pavement section and one end of the dowel displaced vertically relative to the adjacent pavement section to an extreme position.

While the invention has been described in detail as to preferred embodiments, it will be understood that there may be various changes without departing from the spirit of the invention.

I claim:

1. An expansion joint unit for use between paving sections comprising a substantially U-shaped base to provide a space or chamber between spaced apart side walls having an open end opposite to a closed end, a deformable strip having one longitudinal edge inserted in the open end of the space in the base in spaced relation from the bottom of said base and the opposite longitudinal edge projecting above the base, and a cap member adapted in cooperation with the ends of adjacent paving sections to cause the strip to be deformed towards the closed end of the base member, said deformable strip completely filling the joint space between the top of the base member and the cap member, and said walls of the base member adapted to be spaced to predetermine the volume of the space desired in the base member for receiving the material displaced there from the strip.

2. A load transmitting unit comprising a plurality of separate and disconnected dowels, each having one end adapted to be located in a paving section and the opposite end fitted within a cap member, said cap member having a vertical depth approximately equal to the largest vertical cross-section of the end of the dowel fitting therein and a horizontal width substantially greater than the lorgest horizontal cross section of the end of the dowel fitting therein.

3. A load transmitting unit comprising a plurality of independent dowels, each having one end adapted to be located in a paving section and the opposite end fitted within a cap member, said cap member having a vertical depth approximately equal to the largest vertical cross-section of the end of the dowel fitting therein and a horizontal width substantially greater than the largest horizontal cross section of the end of the dowel fitting therein to provide limited free longitudinal displacement of the end of the dowel within the cap and prevent interlocking of the concrete sections during contraction and expansion.

4. A load transmitting unit comprising a plurality of independent dowels, each having one end adapted to be located in a paving section and the opposite end fitted within a cap member, said cap member having a vertical depth substantially equal to the largest vertical cross-section of the end of the dowel fitting therein and a horizontal width substantially greater than the largest horizontal cross-section of the end of the dowel fitting therein to provide, irrespective of whether or not the dowel is arranged longitudinally parallel to the pavement, free longitudinal movement of the adjacent sections of the pavement into which the ends of the dowel project.

5. A load transmitting unit comprising a plurality of independent dowels, each having one end adapted to be located in a paving section and the opposite end fitted within a cap member, said cap member having a vertical depth approximately equal to the largest vertical cross-section of the end of the dowel fitting therein and a horizontal width substantially greater than the largest horizontal cross-section of the end of the dowel fitting therein to provide, irrespective of whether or not the dowel is arranged parallel to the surface of the pavement, free longitudinal movement of the adjacent sections of the pavement into which the ends of the dowel project.

6. A load transmitting unit comprising a plurality of independent dowels, each having one end adapted to be located in a paving section and the opposite end being enlarged and provided with a cap member, said cap member having a cross-sectional area approximately equal to the largest cross sectional area of the enlarged end of the dowel in the cap, and means permitting pivotal movement horizontally between the dowel and cap.

7. A load transmitting unit comprising a plurality of independent dowels, each having enlarged ends adapted to be movably located in a paving section and each end provided with a cap member, said cap member having a cross-sectional area approximately equal to the largest cross-sectional area of the enlarged end of the dowel in the cap, and means permitting pivotal movement horizontally between the dowel and cap.

8. A load transmitting unit comprising a plurality of independent dowels, each having enlarged ends, each end adapted to be movably located in a space within a paving section, each space having a cross-sectional area approximately equal to the largest cross-sectional area of the enlarged end of the dowel in the space, and means permitting pivotal movement horizontally between the dowel and cap.

9. A load transmitting unit comprising a plurality of independent dowels, each having enlarged ends, each end adapted to be fitted into a cap member located in adjacent construction sections, one of said cap members having a cross sectional area approximately equal to the largest cross-sectional area of the end of the dowel fitted therein, and the opposite cap member having a vertical depth approximately equal to the largest vertical cross-section of the end of the dowel fitted therein and a horizontal width substantially greater than the largest horizontal cross-section of the end of the dowel fitted therein.

10. A construction comprising spaced apart sections, an expansion joint strip filling the space between the sections, a plurality of independent load transmitting means projecting through the expansion joint strip and seated in the adjacent ends of the sections, and a cap member for one end of each of the transmitting means having a vertical depth approximately equal to the largest vertical cross-section of the end of the load transmitting means fitting therein and a horizontal width substantially greater than the largest horizontal cross-section of the end of the load transmitting means fitting therein.

LESTER W. DAILEY.